United States Patent
Jha et al.

(10) Patent No.: US 11,689,017 B1
(45) Date of Patent: Jun. 27, 2023

(54) ELECTRICAL POWER SYSTEM HAVING ACTIVE HARMONIC FILTER

(71) Applicant: General Electric Renovables Espana, S.L., Barcelona (ES)

(72) Inventors: Kapil Jha, Bangalore (IN); Arvind Kumar Tiwari, Niskayuna, NY (US)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/548,854

(22) Filed: Dec. 13, 2021

(51) Int. Cl.
    *H02J 3/01*     (2006.01)
    *H02K 7/18*     (2006.01)
    *H02P 9/02*     (2006.01)

(52) U.S. Cl.
    CPC ............... *H02J 3/01* (2013.01); *H02K 7/183* (2013.01); *H02P 9/02* (2013.01); *H02J 2300/28* (2020.01)

(58) Field of Classification Search
    CPC .......... H02J 3/01; H02J 3/381; H02J 2300/24; H02K 7/183; H02P 9/02
    See application file for complete search history.

(56) References Cited

U.S. PATENT DOCUMENTS

| | | | | |
|---|---|---|---|---|
| 5,309,353 A | * | 5/1994 | Schauder | G05B 11/40 363/39 |
| 5,513,090 A | * | 4/1996 | Bhattacharya | H02J 3/1814 363/39 |
| 6,697,270 B1 | * | 2/2004 | Kalman | H02P 9/102 363/51 |
| 10,778,112 B2 | | 9/2020 | Ganireddy et al. | |
| 2018/0323618 A1 | * | 11/2018 | Wagoner | H02J 3/1842 |
| 2020/0382046 A1 | | 12/2020 | Jha et al. | |

FOREIGN PATENT DOCUMENTS

CN     109 378 836 A     2/2019

OTHER PUBLICATIONS

Rahmani et al., A Comprehensive Analysis of Hybrid Active Power Filter for Power Quality Enhancement, IECON 2012 38th Annual Conference on IEEE Industrial Electronics Society, Oct. 2012, pp. 313-318.
EP Search Report for EP application No. 22212243.4., dated May 8, 2023, 8 pages.

(Continued)

*Primary Examiner* — Sean Gugger
(74) *Attorney, Agent, or Firm* — Dority & Manning, P.A.

(57) ABSTRACT

A method of mitigating high frequency harmonics in an output current of an electrical power system connected to a power grid includes providing an active harmonic filter in a stator power path connecting a stator of the generator to the power grid. Further, the method includes controlling, via a controller, the active harmonic filter to selectively extract a high frequency harmonic component from the output current. The method also includes determining, via the controller, whether the high frequency harmonic component is a positive sequence harmonic or a negative sequence harmonic. Moreover, the method includes compensating, via the controller, for the high frequency harmonic component based on whether the high frequency harmonic component is the positive sequence harmonic or the negative sequence harmonic to mitigate the high frequency harmonics in the output current.

14 Claims, 10 Drawing Sheets

(56) References Cited

OTHER PUBLICATIONS

Mishra, Venktesh et al., Load Harmonics Compensation in Autonomous DFIG Based Wind Turbine Systems, 3rd International Conference and Workshops on Recent Advances and Innovations in Engineering, IEEE, Nov. 22, 2018, pp. 1-7.

Phan, Van-Tung et al., Performance Enhancement of Stand-Alone DFIG Systems With Control of Rotor and Load Side Converters Using Resonant Controllers, IEEE Transactions on Industry Applications, vol. 48, No. 1, Jan. 1, 2012, pp. 199-210.

\* cited by examiner

ELECTRICAL POWER SYSTEM HAVING ACTIVE HARMONIC FILTER

FIELD

The present disclosure relates generally to electrical power systems, and more particularly, to an electrical power system, such as a wind turbine power system, having an active harmonic filter to mitigate high frequency harmonics.

BACKGROUND

Wind turbines have received increased attention as a renewable energy source. Wind turbines use the wind to generate electricity. The wind turns multiple rotor blades connected to a rotor. The spin of the rotor blades caused by the wind spins a shaft of the rotor, which connects to a generator that generates electricity. Certain wind turbines include a doubly fed induction generator (DFIG) to convert wind energy into electrical power suitable for output to an electrical grid. DFIGs are typically connected to a power converter that regulates the flow of electrical power between the DFIG and the grid. More particularly, the power converter allows the wind turbine to output electrical power at the grid frequency regardless of the rotational speed of the rotor blades.

A typical DFIG system includes a wind-driven DFIG having a rotor and a stator. The stator of the DFIG is coupled to the electrical grid through a stator bus. The power converter is used to couple the rotor of the DFIG to the electrical grid. The power converter can be a two-stage power converter including both a rotor-side converter and a line-side converter. The rotor-side converter can receive alternating current (AC) power from the rotor via a rotor-side bus and can convert the AC power to a DC power. The line-side converter can then convert the DC power to AC power having a suitable output frequency, such as the grid frequency. The AC power is provided to the electrical grid via a line-side bus.

DFIG wind turbine output current contains switching frequency harmonics which are contributed by the line-side converter and the rotor-side converter via the stator path. Harmonics present in the stator current path due to rotor-side converter switching frequency changes with turbine operation. Passive solutions, such as using a stator distortion filter, have been implemented in the past to reduce the harmonic level, however, such filters do not always meet requirements.

Though active harmonic filters (AHF) have also been utilized, a challenge in AHF operation is to compensate for the high frequency harmonics present in output of the wind turbine. The impedance of the network is proportional to the frequency (assuming primarily inductive), which becomes significantly high at frequencies two times the rotor frequency and above. Hence, it becomes difficult to compensate the high frequency harmonic component.

In addition, the amount of harmonic current generated by the wind turbine at high frequencies is also low. Therefore, it becomes difficult to extract the harmonic component at that frequency and provide compensation. Increasing the gain of the generic compensator, such as the proportional integral controller, can also increase the impact of compensation at lower harmonic frequencies, which are already under the prescribed limits. Moreover, the impact on high order harmonics is less. Further, increasing this gain too high can lead to unstable operation.

Accordingly, the present disclosure is directed to an electrical power system, such as a wind turbine power system, having an active harmonic filter to mitigate high frequency harmonics that addresses the aforementioned issues.

BRIEF DESCRIPTION

Aspects and advantages of embodiments of the present disclosure will be set forth in part in the following description, or may be learned from the description, or may be learned through practice of the embodiments.

In one aspect, the present disclosure is directed to a method of mitigating high frequency harmonics in an output current of an electrical power system connected to a power grid. The electrical power system has a generator with a rotor and a stator. The method includes providing an active harmonic filter in a stator power path connecting the stator of the generator to the power grid. Further, the method includes controlling, via a controller, the active harmonic filter to selectively extract a high frequency harmonic component from the output current. The method also includes determining, via the controller, whether the high frequency harmonic component is a positive sequence harmonic or a negative sequence harmonic. Moreover, the method includes compensating, via the controller, for the high frequency harmonic component based on whether the high frequency harmonic component is the positive sequence harmonic or the negative sequence harmonic to mitigate the high frequency harmonics in the output current. It should be understood that the method may further include any of the additional features and/or steps described herein.

In another aspect, the present disclosure is directed to an electrical power system connected to a power grid. The electrical power system includes a generator having a stator and a rotor. The stator is connected to the power grid via a stator power path. The electrical power system also includes a power converter having a line-side converter coupled to the power grid via a converter power path and a rotor-side converter coupled to a rotor bus of the rotor and the line-side converter via a DC link. Further, the electrical power system includes an active harmonic filter coupled to the stator power path and a controller having at least one processor. The processor(s) is configured to perform a plurality of operations, including but not limited to controlling the active harmonic filter to selectively extract a high frequency harmonic component from an output current of the electrical power system, determining whether the high frequency harmonic component is a positive sequence harmonic or a negative sequence harmonic, and compensating for the high frequency harmonic component based on whether the high frequency harmonic component is the positive sequence harmonic or the negative sequence harmonic to mitigate the high frequency harmonics in the output current. It should be understood that the electrical power system may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods for operating a power converter in a doubly-fed induction generator (DFIG) system. A DFIG system can include a power converter having a line-side converter (LSC) and a rotor-side converter (RSC). A DC link can be coupled between the LSC and the RSC. The power converter can convert an AC power from a stator of the DFIG to a DC power for the DC link using the line-side converter. The power converter can convert the DC power on the DC link to an AC signal for the rotor of the DFIG using the rotor-side converter. For instance, the AC signal can be provided on a rotor bus coupled between the rotor-side converter and the rotor of the DFIG. The AC signal can be used to, for example, control operating characteristics of the DFIG. The DFIG system can also include an active harmonic filter (AHF) having active controlled components (e.g., switching elements insulated gate bipolar transistors IGBTs, insulated gate commuted thyristors, MOSFETs (e.g., Silicon or Silicon Carbide based MOSFETs), bipolar transistors, silicon controlled rectifiers, or other suitable switching elements).

More specifically, the output current of the DFIG system contains switching frequency harmonics which are contributed by the LSC and RSC via stator path. Harmonics present in the stator current path due to RSC switching frequency changes with turbine operation. Passive solutions (such as stator distortion filter) have been utilized in the past to reduce harmonic level, but can fail to meet requirements entirely. A challenge in AHF operation is to compensate high frequency harmonics present in output of turbine. The impedance of the network is proportional to the frequency (assuming primarily inductive), and it becomes significantly high at frequencies two times the rotor frequency and above. Hence, it becomes difficult to compensate the high frequency harmonic component.

Also, the amount of harmonic current generated by the DFIG system at high frequencies is also low. Therefore, it becomes difficult to extract the harmonic component at that frequency and provide compensation. Increasing the gain of a generic compensator, such as a PI regulator, will increase the impact of compensation at lower harmonic frequencies, which are already under the prescribed limits, and impact on high order harmonic is less. Increasing this gain too high can lead to unstable operation.

Hence, the present disclosure is directed to a method to selectively extract the desired harmonic component and compensate the harmonic component in the harmonic synchronous reference frame. It is also determined whether the harmonic component is in positive sequence or negative sequence such that compensation can be provided accordingly.

Figure 1:
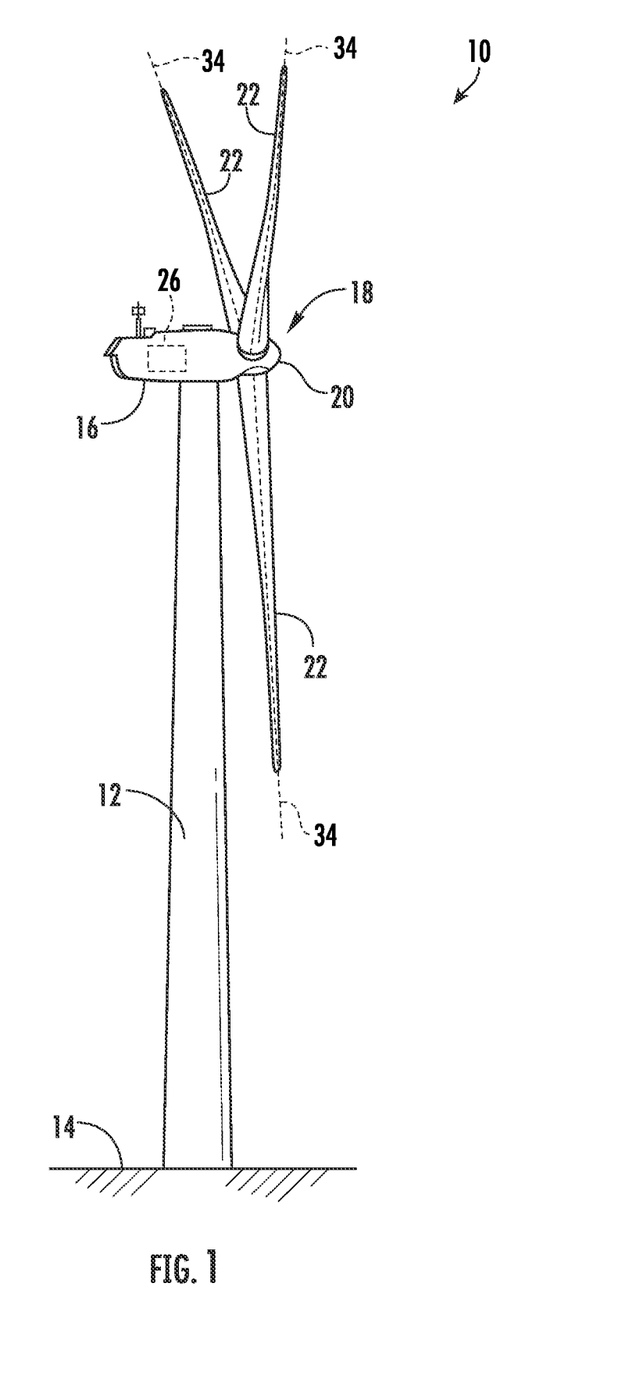
FIG. 1 illustrates a perspective view of a wind turbine according to example embodiments of the present disclosure.

Referring now to the figures, FIG. 1 illustrates a perspective view of one embodiment of a wind turbine 10 according to the present disclosure. In particular, as shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy and, subsequently, electrical energy. For instance, the hub 20 may be rotatably coupled to an electric generator 120 of FIG. 2 positioned within the nacelle 16 to permit electrical energy to be produced. The wind turbine 10 may further include a turbine controller 26 utilized to control yaw adjustment of the wind turbine 10, pitch adjustment of the rotor blades 22 about respective pitch axes 34, and/or torque adjustment of the generator 120 of FIG. 2. Further, in an embodiment, the turbine controller 26 may interface with components within the wind turbine 10, such as the converter controller 140 of FIG. 2.

Figure 2:
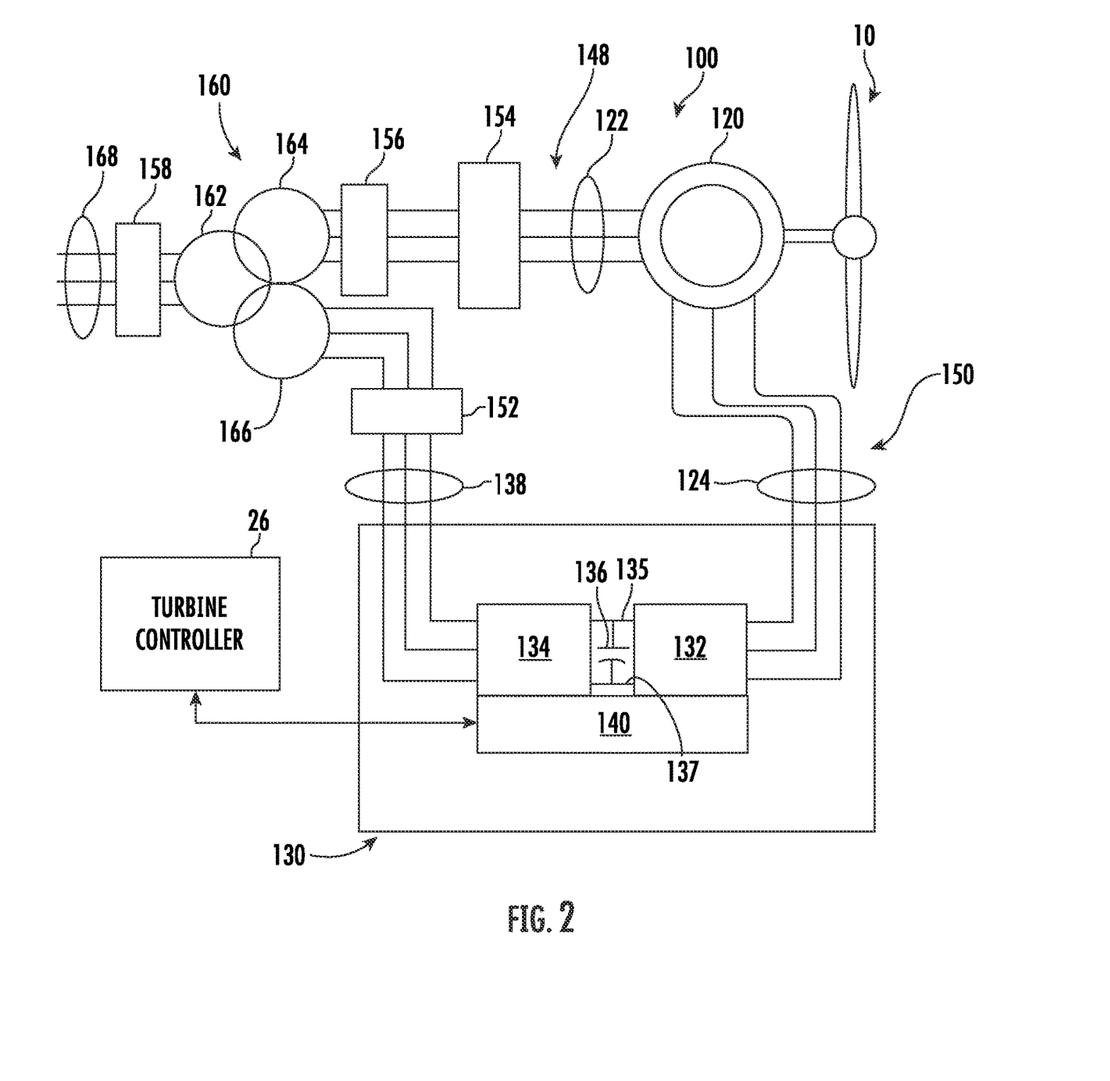
FIG. 2 illustrates an electrical power system according to example embodiments of the present disclosure.

Referring now to FIG. 2, a schematic diagram of an embodiment of a DFIG wind turbine system 100 is illustrated in accordance with aspects of the present disclosure. It should be appreciated that the present disclosure will generally be described herein with reference to the wind turbine system 100 shown in FIG. 2. However, those of ordinary skill in the art, using the disclosures provided herein, should understand that aspects of the present disclosure may also be applicable in other power generation systems.

As shown, the wind turbine system 100 may define a stator power path 148 and a converter power path 150. Further, as shown, the generator 120, e.g., a DFIG 120, can be coupled to a stator bus 122 and a power converter 130 via a rotor-side bus 124. The stator bus 122 can provide an output multiphase power (e.g., three-phase power) from a stator of DFIG 120 and the rotor-side bus 124 can provide an output multiphase power (e.g., three-phase power) of the rotor of DFIG 120. The power converter 130 can have a rotor-side converter 132 and a line-side converter 134. The DFIG 120 can be coupled via the rotor-side bus 124 to the rotor-side converter 132. The rotor-side converter 132 can be coupled to the line-side converter 134 which in turn can be coupled to a line-side bus 138. The rotor-side converter 132 and the line-side converter 134 can be coupled via a DC link 135, 137 across which is the DC link capacitor 136.

In addition, the power converter 130 may be coupled to a converter controller 140 in order to control the operation of the rotor-side converter 132 and the line-side converter 134. For instance, the converter controller 140 may be configured to operate the rotor-side converter 132 in an overmodulation regime, or close to an overmodulation regime. The converter controller 140 may include any number of control devices. In one embodiment, the control devices may include a processing device (e.g., microprocessor, microcontroller, etc.) executing computer-readable instructions stored in a computer-readable medium. The instructions, when executed by the processing device, may cause the processing device to perform operations, including providing control commands (e.g., switching frequency commands) to the switching elements 142 (FIG. 4) of the power converter 130.

Referring still to FIG. 2, the wind turbine system 100 may include a transformer 160 coupling the wind turbine system 100 to an electrical grid 168. In an embodiment, the transformer 160 may be a three-winding transformer that can include a high voltage (e.g., greater than 12 KVAC) primary winding 162 e.g., coupled to the electrical grid, a medium voltage (e.g., 6 KVAC) secondary winding 164 e.g., coupled to the stator bus 122, and/or a low voltage (e.g., 575 VAC, 690 VAC, etc.) auxiliary winding 166 e.g., coupled to the line-side bus 138. It should be understood that the transformer 160 can be a three-winding transformer as shown, or alternatively may be a two-winding transformer having only a primary winding 162 and a secondary winding 164; may be a four-winding transformer having a primary winding 162, a secondary winding 164, an auxiliary winding 166, and an additional auxiliary winding; or may have any other suitable number of windings.

On the stator bus 122, sinusoidal multi-phase (e.g., three-phase) alternating current (AC) power can be provided from the stator of the generator 120 to the stator bus 122, and from the stator bus 122 to the transformer 160, e.g., to the secondary winding 164 thereof. Various circuit breakers, fuses, contactors, and other devices, such as grid circuit breaker 158, stator bus circuit breaker 156, switch 154, and line-side bus circuit breaker 152, can be included in the wind turbine system 100 to connect or disconnect corresponding buses, for example, when current flow is excessive and can damage components of the wind turbine system 100 or for other operational considerations. Additional protection components can also be included in the wind turbine system 100.

Figure 3:
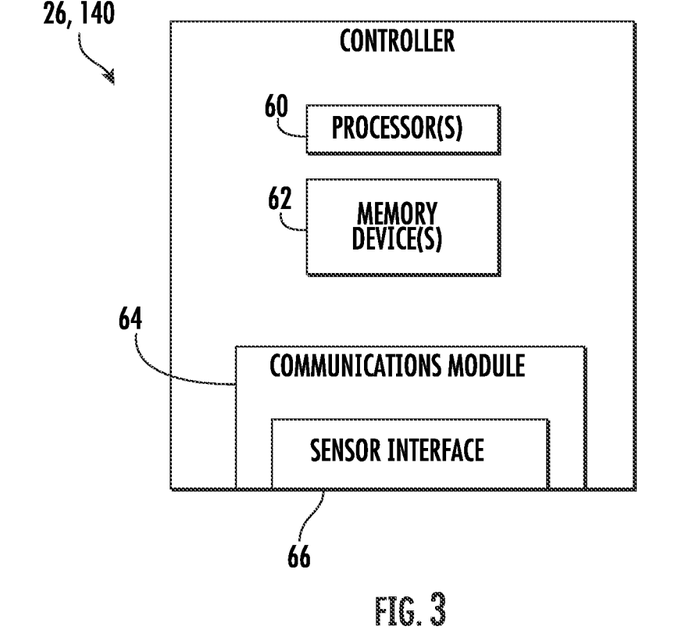
FIG. 3 illustrates a schematic diagram of suitable components that may be included within a controller of a wind turbine and/or electrical power system and/or a controller of a power converter according to example embodiments of the present disclosure.

Referring now to FIG. 3, a block diagram of an embodiment of suitable components (e.g., one or more control devices) that may be included within the turbine controller 26 and/or the converter controller 140 according to the present disclosure is illustrated. As shown, the controller 26, 140 may include one or more processor(s) 60 and associated memory device(s) 62 configured to perform a variety of computer-implemented functions (e.g., performing the methods, steps, calculations and the like disclosed herein). Additionally, the controller 26, 140 may also include a communications module 64 to facilitate communications between the controller 26, 140 and the various components of the wind turbine 10. For instance, the communications module 64 may serve as an interface to permit the turbine controller 26 to transmit control signals to one or more pitch adjustment mechanisms to, for instance, control the pitch of the rotor blades 22. The communications module 64 may additionally and/or alternatively serve as an interface to permit the turbine controller 26 to transmit signals (e.g., control signals or status signals) to the converter controller 140. The communications module 64 may additionally and/or alternatively serve to permit the converter controller 140 to provide control signals to the power converter 130. Moreover, the communications module 64 may include a sensor interface 66 (e.g., one or more analog-to-digital converters) to permit input signals transmitted from, for example, various sensors such as voltage sensors and current sensors, to be converted into signals that can be understood and processed by the processor(s) 60.

Figure 4:
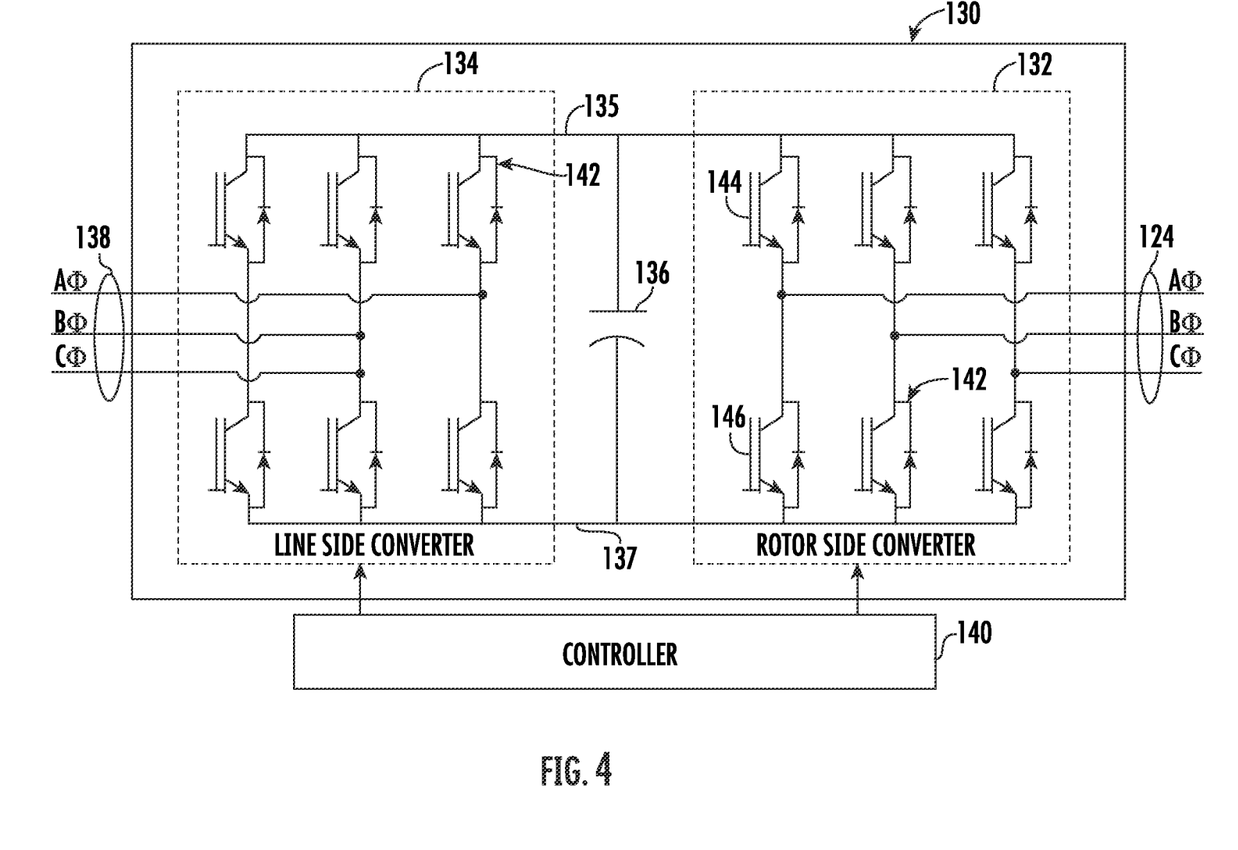
FIG. 4 illustrates a schematic diagram of an example power converter suitable for use with the wind turbine system according to example embodiments of the present disclosure.

Referring now to FIG. 4, a schematic diagram of an example embodiment of the power converter 130 shown in FIG. 2 is illustrated in accordance with aspects of the present disclosure. As shown, the rotor-side converter 132 includes a plurality of bridge circuits, with each phase of the rotor-side bus 124 input to the rotor-side converter 132 being coupled to a single bridge circuit. In addition, the line-side converter 134 may also include a plurality of bridge circuits. Similar to the rotor-side converter 132, the line-side converter 134 also includes a single bridge circuit for each output phase of the line-side converter 134. In other embodiments, the line-side converter 134, the rotor-side converter 132, or both the line-side converter 134 and the rotor-side converter 132 may include parallel bridge circuits without deviating from the scope of the present disclosure.

Each bridge circuit may generally include a plurality of switching elements (e.g., IGBTs) 142 coupled in series with one another. For instance, as shown in FIG. 4, each bridge circuit includes an upper switching element 144 and a lower switching element 146. In addition, a diode may be coupled in parallel with each of the switching elements 142. In alternative embodiments, parallel switching elements 142 and diodes may be used to increase the current rating of the converter. As is generally understood, the line-side converter 134 and the rotor-side converter 132 may be controlled, for instance, by providing control commands, using a suitable driver circuit, to the gates of the switching elements 142. For example, the converter controller 140 may provide suitable gate timing commands to the gates of the switching elements 142 of the bridge circuits. The control commands may control the switching frequency of the switching elements 142 to provide a desired output. It should be appreciated by those of ordinary skill in the art that the power converter 130 may include any suitable switching elements 142, such as insulated gate bipolar transistors (IGBTs), insulated gate commuted thyristors, MOSFETs (e.g., Silicon or Silicon Carbide based MOSFETs), bipolar transistors, silicon controlled rectifiers, or other suitable switching elements.

Figure 5:
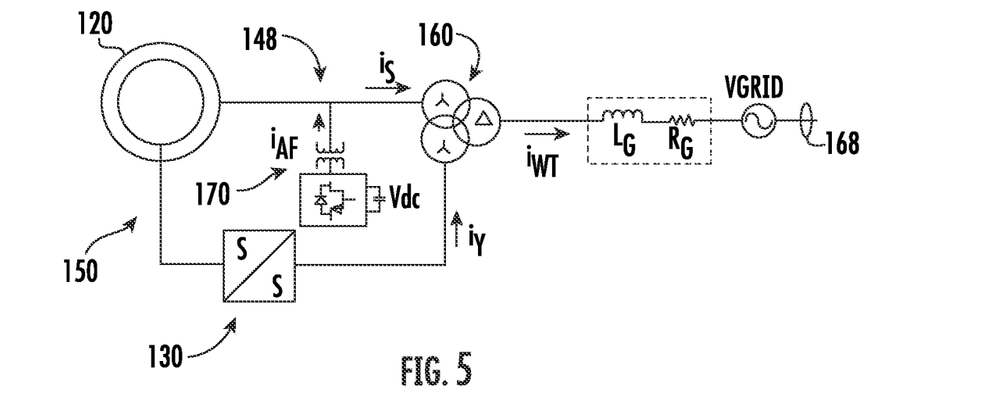
FIG. 5 illustrates a simplified, schematic circuit of part of the wind turbine system of FIG. 2 is illustrated in accordance with aspects of the present disclosure.

Referring now to FIG. 5, a simplified, schematic circuit of part of the wind turbine system 100 of FIG. 2 is illustrated in accordance with aspects of the present disclosure. In particular, as shown, the wind turbine system 100 also includes an active harmonic filter 170 coupled to the stator power path 148 connecting the stator of the DFIG 120 to the power grid 168. In particular, as shown the active harmonic filter 170 may be coupled in parallel with the stator power path 148. Thus, as described herein, the active harmonic filter 170 may be provided to mitigate high frequency harmonics in an output current ($i_{WT}$) of the wind turbine system 100. In particular, as shown, the output current ($i_{WT}$) of the wind turbine system 100 generally includes a stator current (is) (which includes an active filter current iAF) and converter current ($i_Y$). For instance, as shown in FIG. 5, the active harmonic filter 170 can be coupled to the stator bus, i.e., between the stator and the transformer 160. Thus, as shown, the active harmonic filter 170 may take as input Is, i.e., the current on the stator bus 122. In some embodiments, as shown, the active harmonic filter 170 can be directly coupled to terminals of the stator bus 122. The active harmonic filter 170 may also be configured to receive at least one electrical condition from at least one of the rotor bus, the line-side converter, the rotor-side converter, the stator bus, the grid interconnection bus, and the DC link.

Figure 6:
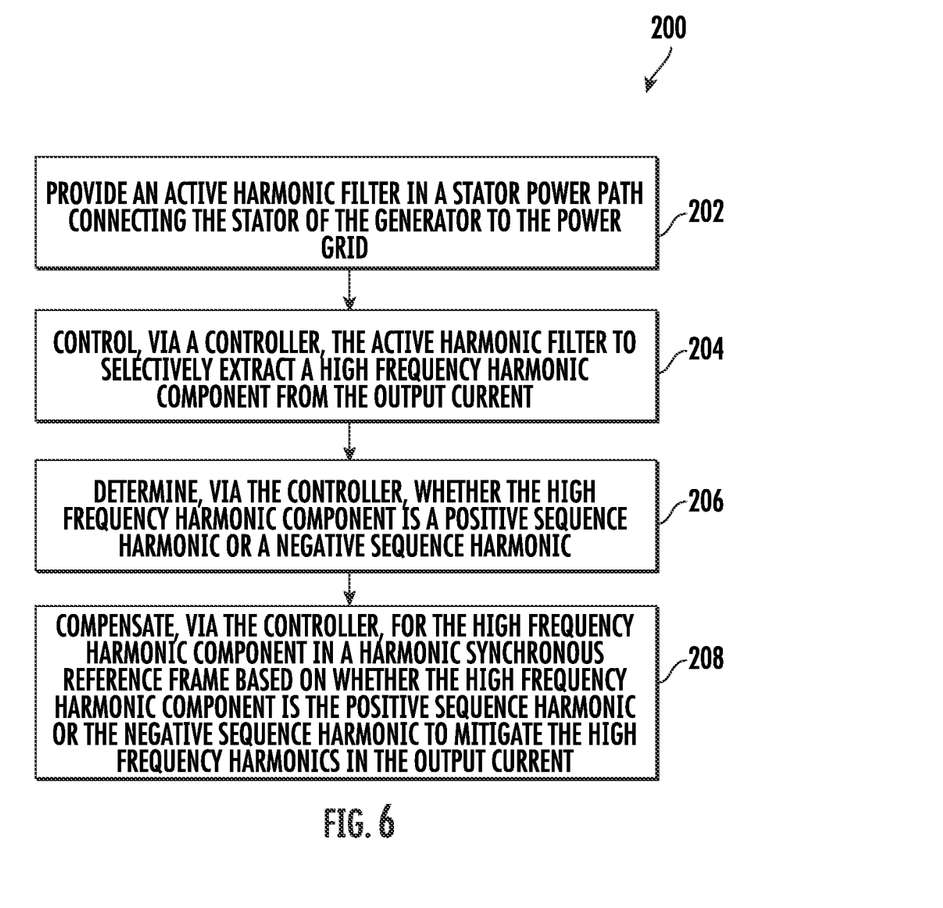
FIG. 6 illustrates a flow diagram of one embodiment of a method of mitigating high frequency harmonics components in an output current of an electrical power system connected to a power grid in accordance with aspects of the present disclosure.

More specifically, and referring now to FIG. 6, a flow diagram of one embodiment of a method 200 of mitigating high frequency harmonics, such as high frequency harmonic components having a frequency value greater than 1000 Hertz (Hz), such as greater than 2000 Hz and less than 9000 Hz, in an output current of an electrical power system connected to a power grid is illustrated in accordance with aspects of the present disclosure. As used herein the electrical power system may include the wind turbine power system 100, a solar power system, an energy storage power system, or combinations thereof. It should be further understood that the threshold for whether a particular frequency harmonic component is high may be generally set by grid code requirements and therefore may vary. In general, the method 200 will be described herein as being implemented using a wind turbine system, such as the DFIG wind turbine system 100 described above with reference to FIGS. 2 and 5. However, it should be appreciated that the disclosed method 200 may be implemented using any other suitable power generation system that is configured to supply power for application to a load. In addition, although FIG. 6 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, performed simultaneously, combined and/or adapted in various ways. Additional steps not disclosed herein may be performed without departing from the scope or spirit of the present disclosure.

As shown at (202), the method 200 includes providing an active harmonic filter in a stator power path connecting the stator of the generator to the power grid. As shown at (204), the method 200 includes controlling, via a controller, the active harmonic filter to selectively extract a high frequency harmonic component from the output current. In an embodiment, the method 200 may also include determining that the output current of the electrical power system exceeds one or more grid code requirements before controlling the active harmonic filter to selectively extract the high frequency harmonic component from the output current.

As shown at (206), the method 200 includes determining, via the controller, whether the high frequency harmonic component is a positive sequence harmonic or a negative sequence harmonic. As shown at (208), the method 200 includes compensating, via the controller, for the high frequency harmonic component in a harmonic synchronous reference frame based on whether the high frequency harmonic component is the positive sequence harmonic or the negative sequence harmonic to mitigate the high frequency harmonics in the output current. For example, in an embodiment, compensating for the high frequency harmonic component in the harmonic synchronous reference frame to mitigate the high frequency harmonics in the output current may include receiving the high frequency harmonic component, rotating the high frequency harmonic component to a d-q reference frame, applying a proportional-integral regulator to the high frequency harmonic component in the d-q reference frame to obtain a compensated signal, and rotating the compensated signal back to an a-b-c reference frame.

Moreover, in an embodiment, compensating for the high frequency harmonic component in the harmonic synchronous reference frame based on whether the high frequency harmonic component is the positive sequence harmonic or the negative sequence harmonic to mitigate the high frequency harmonics in the output current may include determining one of a positive amount of frequency compensation for the positive sequence harmonic or a negative amount of frequency compensation the negative sequence harmonic based on whether the high frequency harmonic component is the positive sequence harmonic or the negative sequence harmonic. In such embodiments, the positive amount of frequency compensation for the positive sequence harmonic may be greater than the negative amount of frequency compensation the negative sequence harmonic.

Figure 13:
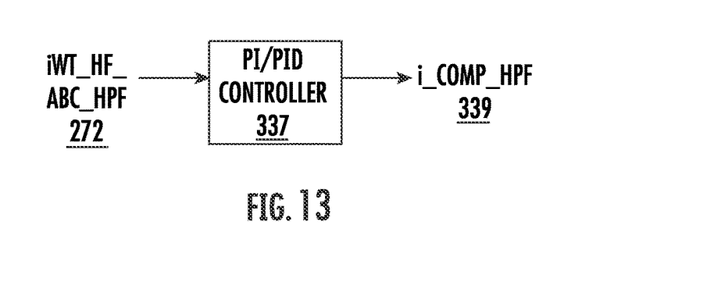
Figure 14:
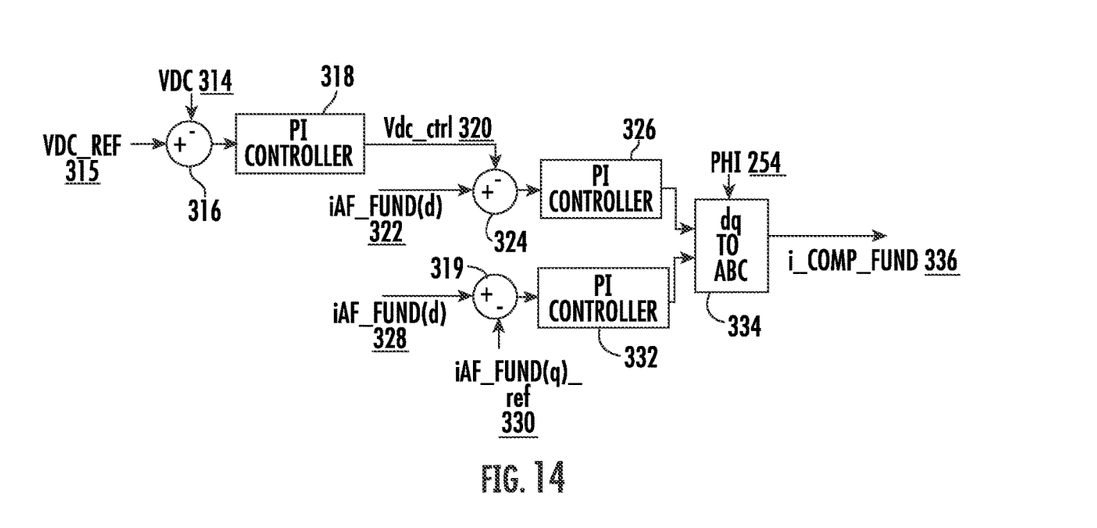
Figure 15:
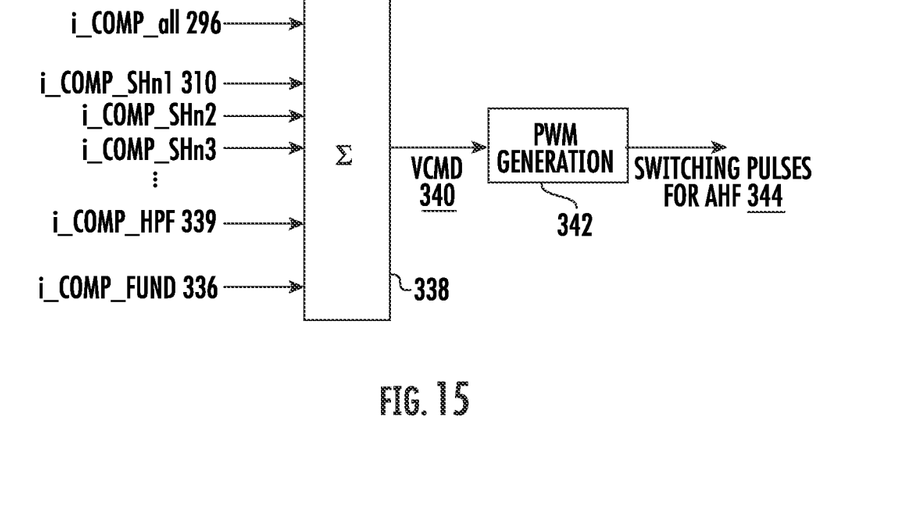
FIG. 15 illustrates a schematic diagram of an embodiment of a modulator according to the present disclosure.

The method 200 of FIG. 6 can be better understood with reference to FIGS. 7-15. In particular, FIGS. 7-10 illustrate various feedback signal processing diagrams according to the present disclosure. FIGS. 11-14 illustrates various controller diagrams according to the present disclosure; and FIG. 15 illustrates an embodiment of a modulator according to the present disclosure.

Figure 7:
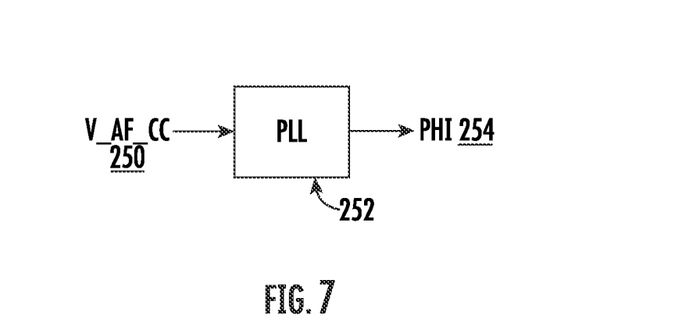
FIGS. 7-10 illustrate various feedback signal processing diagrams in accordance with aspects of the present disclosure.

Referring particularly to FIGS. 7-10, a voltage 250 (V_AF_CC) of the active harmonic filter 170 (FIG. 7), the output current 256 of the wind turbine system 100 (FIG. 8), a high frequency harmonic component 268 (IWT_HF_abc) of the output current (FIG. 9), and the active filter current iAF (FIG. 10) may be received and further processed by a controller, such as one of controllers 26, 140. More specifically, as shown in FIG. 7, the voltage 250 of the active harmonic filter 170 may be processed via a phase-locked loop 252 to obtain angle phi 254, which is further used by the controller(s) as described herein below.

Figure 8:
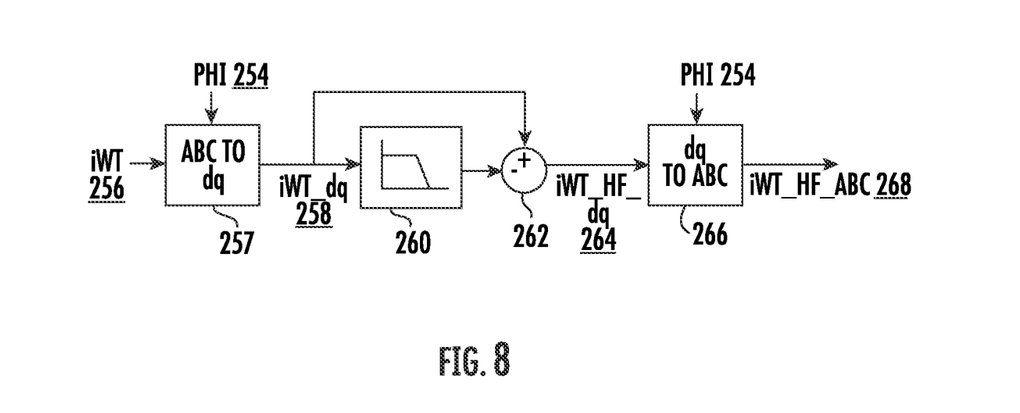

Referring particularly to FIG. 8, the output current 256 of the wind turbine system 100 may be rotated as shown at 257 from an a-b-c reference frame to a d-q reference frame using phi 254 to obtain the output current 258 in the d-q reference frame (iWT_dq). The output current 258 in the d-q reference frame can then be filtered via filter 260. In addition, as shown at 262, the filtered signal can be subtracted output current 258 in the d-q reference frame to obtain the high frequency harmonic component 264 of the signal in the d-q reference frame. The high frequency harmonic component 264 of the signal in the d-q reference frame can then be rotated by to the a-b-c reference frame as shown at 266 by phi 254 to obtain the high frequency harmonic component 268 in the a-b-c reference frame.

Figure 9:
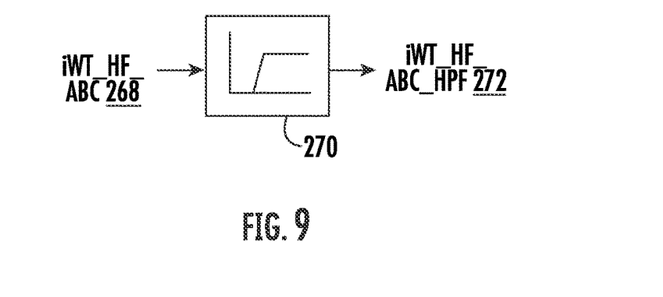
Figure 10:
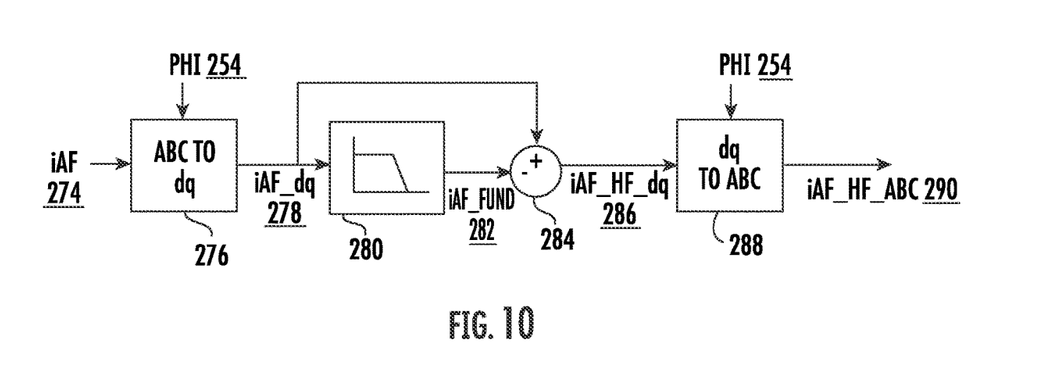

Referring particularly to FIG. 9, the high frequency harmonic component 268 in the a-b-c reference frame (IWT_HF_abc) may also be filtered via filter 270 (such as a high pass filter) to obtain a filtered signal 272 (iWT_HF_abc_HPF). In addition, as shown in FIG. 10, the active filter current iAF may be rotated as shown at 276 from an a-b-c reference frame to a d-q reference frame using phi 254 to obtain the active filter current 278 in the d-q reference frame (iAF_dq). The active filter current 278 in the d-q reference frame can then be filtered via filter 280 to obtain filtered signal 282 (iAF fund). In addition, as shown at 284, the filtered signal 282 can be subtracted the active filter current 278 in the d-q reference frame to obtain the high frequency harmonic component 286 of the signal in the d-q reference frame. The high frequency harmonic component 286 of the signal in the d-q reference frame can then be rotated by to the a-b-c reference frame as shown at 288 by phi 254 to obtain the high frequency harmonic component 290 in the a-b-c reference frame.

Figure 11:
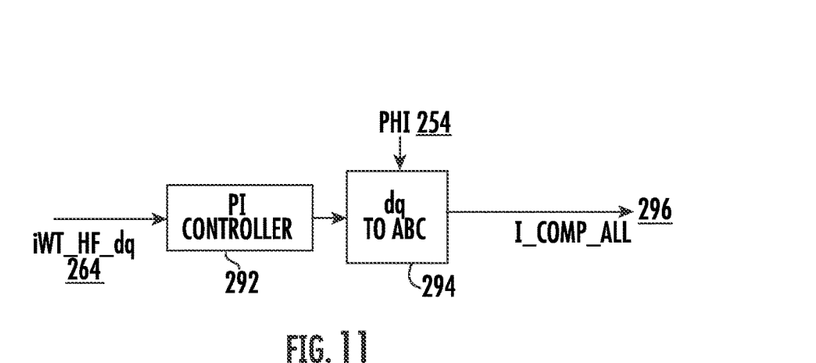
FIGS. 11-14 illustrate various controller diagrams in accordance with aspects of the present disclosure.
Figure 12:
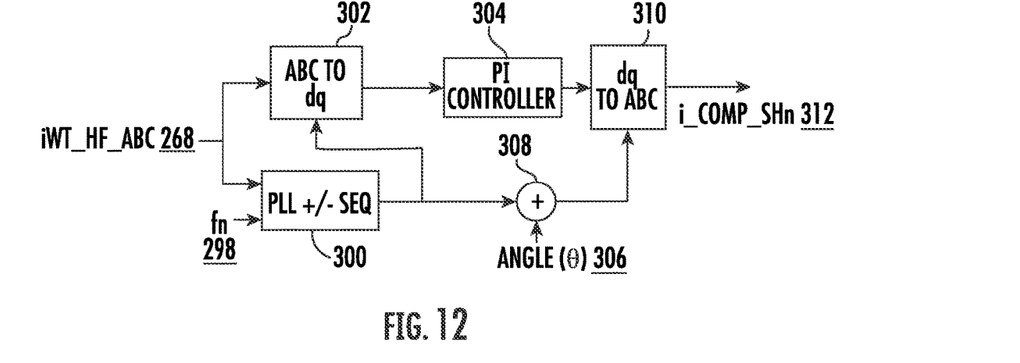

Referring now to FIGS. 11-14, various controller diagrams are illustrated to illustrate how the processed signals of FIGS. 7-10 are used according to the present disclosure. In particular, as shown in FIG. 11, the high frequency harmonic component 264 of the signal in the d-q reference frame is received by a proportional-integral (PI) controller 292, which is configured to compensate the signal. The output of the PI controller 292 can then be rotated as shown at 294 by phi 254. The a-b-c signal (i_comp_all) 296 represents the compensation signal that can be applied by the modulator 338 (FIG. 14).

Referring particularly to FIG. 12, the high frequency harmonic component 268 (IWT_HF_abc) of the output current (FIG. 9) is received and rotated to a d-q reference frame 302. The output can then be regulated via a PI regulator 304 that can be rotated back to the a-b-c reference frame as shown at 310. In addition, as shown, the control logic may include a phase-locked loop (PLL) 300 that receives the high frequency harmonic component 268 in the d-q reference frame and a bias frequency input 298. The PLL 300 may then determine an angle for the high frequency harmonic component 268 based on the bias frequency input 298, which is used to transform the abc (synchronous) frame variable to the dq (rotating) frame variable. Then, the PI regulator 304 is applied on the dq transformed variables. Accordingly, the PLL 300 is configured to attenuate the high frequency harmonic component 268. Thus, the PLL 300 is used to extract the harmonic component from the overall spectrum. An output of the PLL 300 is generally a phase which is used in Park/Inverse Park Transformations (a-b-c to d-q/d-q to a-b-c conversions). Accordingly, the d-q converted signals can be used for control purposes. In particular, as shown, the output of the phase-locked loop 300 can be sent to 302 and 308. In particular, as shown at 308, the output from the phase-locked loop 300 and an angle 306 can be used as an input 310 (i.e., for rotating the output from the PI controller 304 back to the a-b-c reference frame). Accordingly, as shown, once rotated, the output signal is representative of a specific harmonic compensation signal 312 (i_comp_SHn).

Referring particularly to FIG. 13, the filtered signal 272 (iWT_HF_abc_HPF) may be regulated via a PI/PID regulator 337 to obtain a high pass filter compensation signal 339 (i_comp_HPF). Furthermore, as shown particularly to FIG. 14, a voltage reference 315 (Vdc_ref) is received at 316 and compared to a voltage feedback signal 314 (Vdc). The difference between the two signals can then be regulated via a proportional integral (PI) regulator 318 to obtain a voltage control signal 320 (Vdc_ctrl). As shown at 324, the voltage control signal 320 can be compared to a d-component of the fundamental active filter current 322 (iAF_fund(d)). Thus, the difference between the two signals can be regulated via PI controller 326. In addition, as shown at 319, a q-component of the fundamental active filter current 328 (iAF_fund (q)) is compared to a q-component of a reference fundamental active filter current 330 (iAF_fund(d) ref). Thus, the difference between the two signals can be regulated via PI controller 332. The outputs from each of the PI controllers 326, 332 can then be rotated back to the a-b-c reference frame as shown at 334 via phi 254. Accordingly, as shown, once rotated, the output signal is representative of a fundamental frequency compensation signal 336 (i_comp_fund).

Referring particularly to FIG. 15, a schematic diagram of an embodiment of a modulator 338 according to the present disclosure is illustrated. Thus, as shown, the modulator 338 receives the various inputs from the control logics illustrated in FIGS. 11-13, which may include the compensation signal 296 (i_comp_all), the specific harmonic compensation signal 312 (i_comp_SHn1, etc.), the high pass filter compensation signal 339 (i_comp_HPF), and/or the fundamental frequency compensation signal 336. Thus, as shown, the modulator 338 is configured to generate a voltage command 340 (Vcmd) as a function of the various input signals. Further, as shown, the control logic may also include a PWM generation module 342 that generates switching pulses 344 for the active harmonic filter 170.

Figure 16:
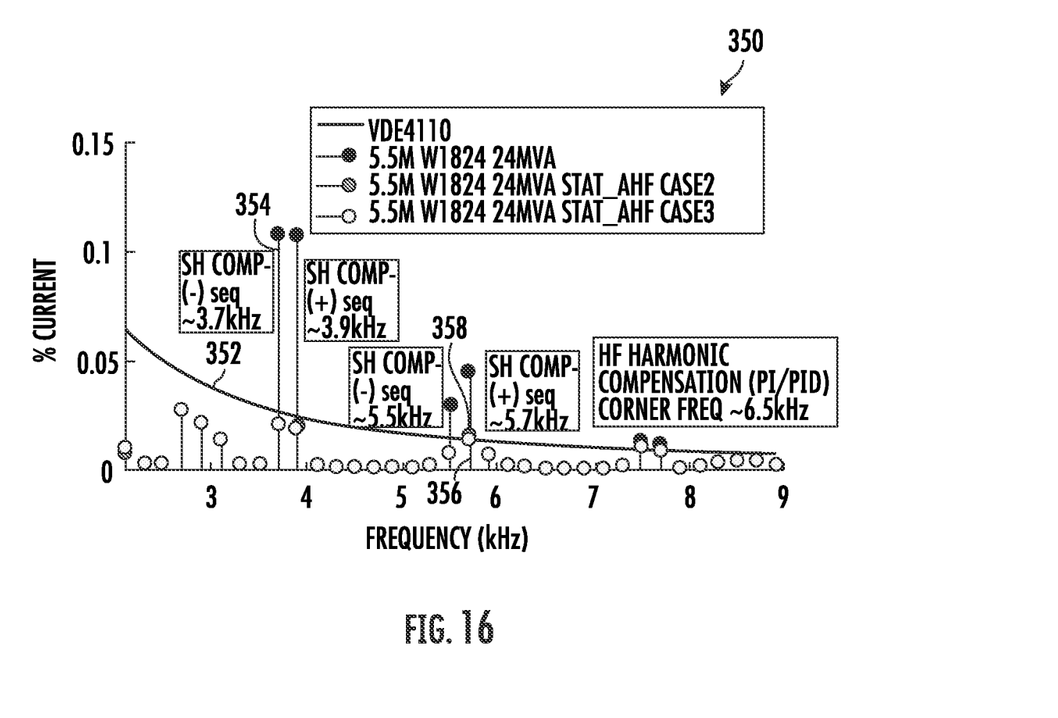
FIG. 16 illustrates a graph of high order current harmonic groups, particularly illustrating a benefit of implementing the method of mitigating high frequency harmonics components in an output current of an electrical power system in accordance with aspects of the present disclosure.

Referring now to FIG. 16, a graph 350 of percent (%) current (y-axis) versus frequency (kHz) (x-axis) for high order current harmonic groups according to the present disclosure is provided, particularly illustrating a benefit of implementing the method of mitigating high frequency harmonics components in an output current of an electrical power system in accordance with aspects of the present disclosure. In particular, as shown, data 352, 354 represent harmonic groups without any mitigating of high frequency harmonics in the output current of the system, whereas data 356, 358 represent harmonic groups with mitigating of high frequency harmonics in the output current of the system being implemented.

Figure 17:
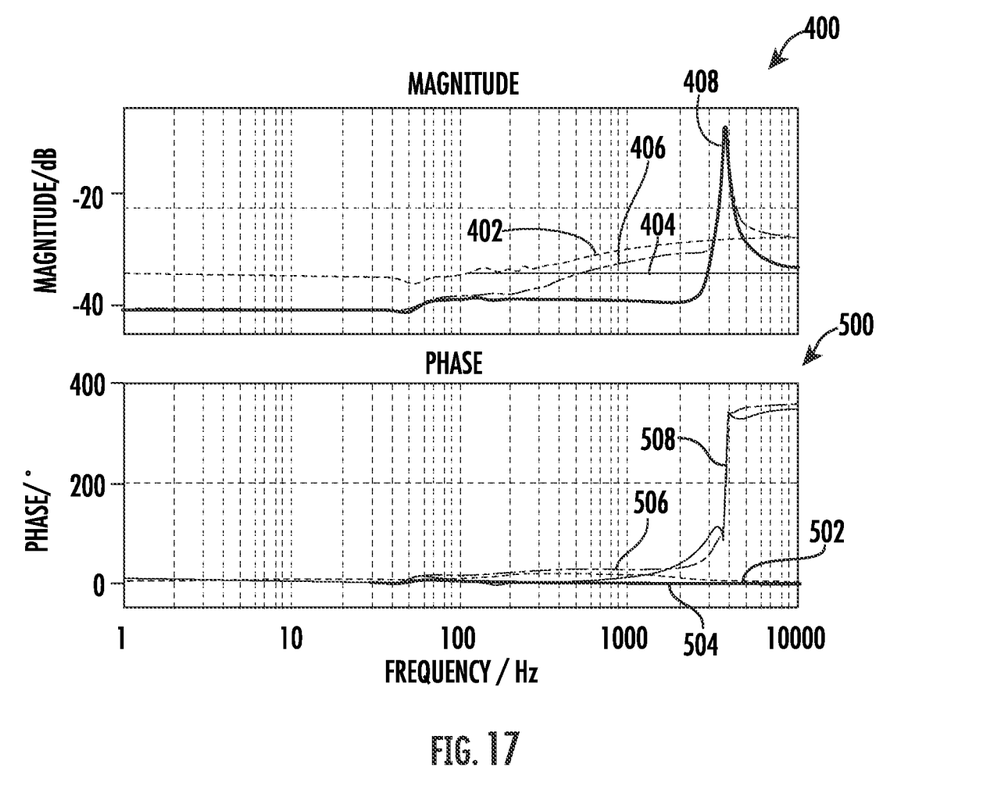
FIG. 17 illustrates graphs depicting implementation of selective harmonic compensation, which provides high gain at specific frequencies to improve attenuation in harmonics at those frequencies in accordance with aspects of the present disclosure.

Referring now to FIG. 17, illustrates graphs 400, 500 depicting implementation of selective harmonic compensation, which provides high gain at specific frequencies to improve attenuation in harmonics at those frequencies in accordance with aspects of the present disclosure. In particular, as shown in graphs 400 and 500, the magnitude and phase versus frequency for different control algorithms are illustrated. In particular, as shown in graph 400, various control algorithms for AHF 170 control of the magnitude are provided, such as curve 402 representing PID control; curve 404 representing PI control; curve 406 representing PID plus specific harmonic (SH) compensation, and curve 408 representing PI plus SH compensation. Furthermore, graph 500 includes various control algorithms for AHF 170 control of the phase, such as curve 502 representing PID control; curve 504 representing PI control; curve 506 representing PID plus SH compensation, and curve 508 representing PI plus SH compensation.

Further aspects of the invention are provided by the subject matter of the following clauses:

Clause 1. A method of mitigating high frequency harmonics in an output current of an electrical power system connected to a power grid, the electrical power system having a generator with a rotor and a stator, the method comprising:

providing an active harmonic filter in a stator power path connecting the stator of the generator to the power grid;

controlling, via a controller, the active harmonic filter to selectively extract a high frequency harmonic component from the output current;

determining, via the controller, whether the high frequency harmonic component is a positive sequence harmonic or a negative sequence harmonic; and compensating, via the controller, for the high frequency harmonic component based on whether the high frequency harmonic component is the positive sequence harmonic or the negative sequence harmonic to mitigate the high frequency harmonics in the output current.

Clause 2. The method of clause 1, wherein the high frequency harmonic component comprises a frequency value greater than 1000 Hertz (Hz).

Clause 3. The method of any of the preceding clauses, further comprising determining that the output current of the electrical power system exceeds one or more grid code requirements before controlling the active harmonic filter to selectively extract the high frequency harmonic component from the output current.

Clause 4. The method of any of the preceding clauses, wherein compensating for the high frequency harmonic component in a harmonic synchronous reference frame based on whether the high frequency harmonic component is the positive sequence harmonic or the negative sequence harmonic to mitigate the high frequency harmonics in the output current further comprises:

receiving the high frequency harmonic component;

rotating the high frequency harmonic component to a d-q reference frame;

applying a proportional-integral regulator to the high frequency harmonic component in the d-q reference frame to obtain a compensated signal; and rotating the compensated signal back to an a-b-c reference frame.

Clause 5. The method of clause 4, further comprising:

receiving, via a phase-locked loop of the controller, the high frequency harmonic component in the d-q reference frame and a bias frequency input;

determining, via the phase-locked loop, an angle for the high frequency harmonic component based on the bias frequency input; and applying the angle to the high frequency harmonic component to attenuate the high frequency harmonic component.

Clause 6. The method of any of the preceding clauses, wherein compensating for the high frequency harmonic component based on whether the high frequency harmonic component is the positive sequence harmonic or the negative sequence harmonic to mitigate the high frequency harmonics in the output current further comprises:

determining compensation for the positive sequence harmonic or the negative sequence harmonic based on whether the high frequency harmonic component is the positive sequence harmonic or the negative sequence harmonic.

Clause 7. The method of any of the preceding clauses, wherein compensating for the high frequency harmonic component based on whether the high frequency harmonic component is the positive sequence harmonic or the negative sequence harmonic further comprises compensating for the high frequency harmonic component in a harmonic synchronous frame.

Clause 8. The method of any of the preceding clauses, wherein the electrical power system comprises at least one of a wind turbine power system, a solar power system, an energy storage power system, or combinations thereof.

Clause 9. The method of clause 8, wherein the controller comprises at least one of a turbine controller or a converter controller of the wind turbine power system.

Clause 10. An electrical power system connected to a power grid, comprising:

a generator comprising a stator and a rotor, the stator connected to the power grid via a stator power path;

a power converter comprising a line-side converter coupled to the power grid via a converter power path and a rotor-side converter coupled to a rotor bus of the rotor and the line-side converter via a DC link;

an active harmonic filter coupled to the stator power path; and a controller comprising at least one processor, the at least one processor configured to perform a plurality of operations, the plurality of operations comprising:

controlling the active harmonic filter to selectively extract a high frequency harmonic component from an output current of the electrical power system;

determining whether the high frequency harmonic component is a positive sequence harmonic or a negative sequence harmonic; and compensating for the high frequency harmonic component based on whether the high frequency harmonic component is the positive sequence harmonic or the negative sequence harmonic to mitigate the high frequency harmonics in the output current.

Clause 11. The electrical power system of clause 10, wherein the high frequency harmonic component comprises a frequency value greater than 1000 Hertz (Hz).

Clause 12. The electrical power system of clauses 10-11, wherein the plurality of operations further comprise determining that the output current of the electrical power system exceeds one or more grid code requirements before controlling the active harmonic filter to selectively extract the high frequency harmonic component from the output current.

Clause 13. The electrical power system of clauses 10-12, wherein compensating for the high frequency harmonic component in a harmonic synchronous reference frame based on whether the high frequency harmonic component is the positive sequence harmonic or the negative sequence harmonic to mitigate the high frequency harmonics in the output current further comprises:

receiving the high frequency harmonic component;

rotating the high frequency harmonic component to a d-q reference frame;

applying a proportional-integral regulator to the high frequency harmonic component in the d-q reference frame to obtain a compensated signal; and rotating the compensated signal back to an a-b-c reference frame.

Clause 14. The electrical power system of clause 13, wherein the plurality of operations further comprise:

receiving, via a phase-locked loop of the controller, the high frequency harmonic component in the d-q reference frame and a bias frequency input;

determining, via the phase-locked loop, an angle for the high frequency harmonic component based on the bias frequency input; and applying the angle to the high frequency harmonic component to attenuate the high frequency harmonic component.

Clause 15. The electrical power system of clauses 10-14, wherein compensating for the high frequency harmonic component based on whether the high frequency harmonic component is the positive sequence harmonic or the negative sequence harmonic to mitigate the high frequency harmonics in the output current further comprises:

determining one of a positive amount of frequency compensation for the positive sequence harmonic or a negative amount of frequency compensation the negative sequence harmonic based on whether the high frequency harmonic component is the positive sequence harmonic or the negative sequence harmonic.

Clause 16. The electrical power system of clauses 10-15, wherein compensating for the high frequency harmonic component based on whether the high frequency harmonic component is the positive sequence harmonic or the negative sequence harmonic further comprises compensating for the high frequency harmonic component in a harmonic synchronous frame.

Clause 17. The electrical power system of clauses 10-16, wherein the electrical power system comprises at least one of a wind turbine power system, a solar power system, an energy storage power system, or combinations thereof.

Clause 18. The electrical power system of clause 17, wherein the controller comprises at least one of a turbine controller or a converter controller of the wind turbine power system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of mitigating high frequency harmonics in an output current of an electrical power system connected to a power grid, the electrical power system having a generator with a rotor and a stator, the method comprising:
   providing an active harmonic filter in a stator power path connecting the stator of the generator to the power grid;
   controlling, via a controller, the active harmonic filter to selectively extract a high frequency harmonic component from the output current;
   determining, via the controller, whether the high frequency harmonic component is a positive sequence harmonic or a negative sequence harmonic; and
   compensating, via the controller, for the high frequency harmonic component based on whether the high frequency harmonic component is the positive sequence harmonic or the negative sequence harmonic to mitigate the high frequency harmonics in the output current,
   wherein compensating for the high frequency harmonic component based on whether the high frequency harmonic component is the positive sequence harmonic or the negative sequence harmonic further comprises:
   via a first control path, rotating the high frequency harmonic component to a d-q reference frame based on a first angular position;
   applying a proportional-integral regulator to the high frequency harmonic component in the d-q reference frame to obtain a compensated signal;
   rotating the compensated signal back to an a-b-c reference frame;
   via a second control path, generating, via a phase-locked loop of the controller, the first angular position for the d-q reference frame based on the high frequency harmonic component and a bias frequency input;
   generating a second angular position as a function of an input angle and the first angular position from the phase-locked loop; and
   applying the second angular position to the high frequency harmonic component of the first control path to determine a harmonic compensation signal that attenuates the high frequency harmonic component.

2. The method of claim 1, wherein the high frequency harmonic component comprises a frequency value greater than 1000 Hertz (Hz).

3. The method of claim 1, further comprising determining that the output current of the electrical power system exceeds one or more grid code requirements before controlling the active harmonic filter to selectively extract the high frequency harmonic component from the output current.

4. The method of claim 1, wherein compensating for the high frequency harmonic component based on whether the high frequency harmonic component is the positive sequence harmonic or the negative sequence harmonic to mitigate the high frequency harmonics in the output current further comprises:
   determining compensation for the positive sequence harmonic or the negative sequence harmonic based on whether the high frequency harmonic component is the positive sequence harmonic or the negative sequence harmonic.

5. The method of claim 1, wherein compensating for the high frequency harmonic component based on whether the high frequency harmonic component is the positive sequence harmonic or the negative sequence harmonic further comprises compensating for the high frequency harmonic component in a harmonic synchronous frame.

6. The method of claim 1, wherein the electrical power system comprises a wind turbine power system.

7. The method of claim 6, wherein the controller comprises at least one of a turbine controller or a converter controller of the wind turbine power system.

8. An electrical power system connected to a power grid, comprising:
   a generator comprising a stator and a rotor, the stator connected to the power grid via a stator power path;
   a power converter comprising a line-side converter coupled to the power grid via a converter power path and a rotor-side converter coupled to a rotor bus of the rotor and the line-side converter via a DC link;
   an active harmonic filter coupled to the stator power path; and
   a controller comprising at least one processor, the at least one processor configured to perform a plurality of operations, the plurality of operations comprising:
   controlling the active harmonic filter to selectively extract a high frequency harmonic component from an output current of the electrical power system;

determining whether the high frequency harmonic component is a positive sequence harmonic or a negative sequence harmonic; and compensating for the high frequency harmonic component based on whether the high frequency harmonic component is the positive sequence harmonic or the negative sequence harmonic to mitigate the high frequency harmonics in the output current, wherein compensating for the high frequency harmonic component based on whether the high frequency harmonic component is the positive sequence harmonic or the negative sequence harmonic further comprises:

via a first control path, rotating the high frequency harmonic component to a d-q reference frame based on a first angular position;

applying a proportional-integral regulator to the high frequency harmonic component in the d-q reference frame to obtain a compensated signal;

rotating the compensated signal back to an a-b-c reference frame;

via a second control path, generating, via a phase-locked loop of the controller, the first angular position for the d-q reference frame based on the high frequency harmonic component and a bias frequency input;

generating a second angular position as a function of an input angle and the first angular position from the phase-locked loop; and applying the second angular position to the high frequency harmonic component of the first control path to determine a harmonic compensation signal that attenuates the high frequency harmonic component.

9. The electrical power system of claim 8, wherein the high frequency harmonic component comprises a frequency value greater than 1000 Hertz (Hz).

10. The electrical power system of claim 8, wherein the plurality of operations further comprise determining that the output current of the electrical power system exceeds one or more grid code requirements before controlling the active harmonic filter to selectively extract the high frequency harmonic component from the output current.

11. The electrical power system of claim 8, wherein compensating for the high frequency harmonic component in the harmonic synchronous reference frame based on whether the high frequency harmonic component is the positive sequence harmonic or the negative sequence harmonic to mitigate the high frequency harmonics in the output current further comprises:

determining one of a positive amount of frequency compensation for the positive sequence harmonic or a negative amount of frequency compensation the negative sequence harmonic based on whether the high frequency harmonic component is the positive sequence harmonic or the negative sequence harmonic.

12. The electrical power system of claim 8, wherein compensating for the high frequency harmonic component based on whether the high frequency harmonic component is the positive sequence harmonic or the negative sequence harmonic further comprises compensating for the high frequency harmonic component in a harmonic synchronous frame.

13. The electrical power system of claim 8, wherein the electrical power system comprises a wind turbine power system.

14. The electrical power system of claim 13, wherein the controller comprises at least one of a turbine controller or a converter controller of the wind turbine power system.

* * * * *